(12) United States Patent
Nakano

(10) Patent No.: US 8,041,213 B2
(45) Date of Patent: Oct. 18, 2011

(54) OPTICAL TRANSMISSION EQUIPMENT AND OPTICAL NETWORK

(75) Inventor: Hiroyuki Nakano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 510 days.

(21) Appl. No.: 12/275,427

(22) Filed: Nov. 21, 2008

(65) Prior Publication Data

US 2009/0142057 A1    Jun. 4, 2009

(30) Foreign Application Priority Data

Nov. 21, 2007   (JP) ................................. 2007-301671
Oct. 10, 2008   (JP) ................................. 2008-263614

(51) Int. Cl.
*H04J 14/00* (2006.01)
(52) U.S. Cl. ................. 398/50; 398/48; 398/43; 398/83
(58) Field of Classification Search .................... 398/50, 398/48, 43, 83
See application file for complete search history.

(56) References Cited

U.S. PATENT DOCUMENTS

| 5,825,517 | A | * | 10/1998 | Antoniades et al. | ............ | 398/50 |
| 7,526,198 | B1 | * | 4/2009 | Chiu et al. | ............ | 398/19 |
| 2008/0080861 | A1 | * | 4/2008 | Chung et al. | ............ | 398/56 |

FOREIGN PATENT DOCUMENTS

JP    2003-125430    4/2003

* cited by examiner

*Primary Examiner* — Kinam Park
(74) *Attorney, Agent, or Firm* — Antonelli, Terry, Stout & Kraus, LLP.

(57) ABSTRACT

In order to insert a regenerator into a wavelength cross-connect equipment, there is provided at least one port that demultiplexes one wavelength among the wavelength multiplexed signals that are input to a wavelength selective switch. An output of the port that demultiplexes one wavelength is input to the regenerator, and an output of the regenerator is again input to the WSS. The wavelength output from the regenerator is converted into another wavelength different from the wavelength that is input to the regenerator and can be processed by the WSS in advance. The output from the regenerator is input to the WSS through an optical coupler or another input port of the WSS.

16 Claims, 9 Drawing Sheets

N x 1 WSS 1 x N WSS ized technology of the OADM equipment and the WXC equipment will be described. FIGS. 1A to 1D are block diagrams showing the an optical transmission equipment and an optical network which use a wavelength selective switch that is capable of regenerating a through signal.

OPTICAL TRANSMISSION EQUIPMENT AND OPTICAL NETWORK

CLAIM OF PRIORITY

The present application claims priority from Japanese patent application serial nos. 2007-301671 and 2008-263614, filed on Nov. 21, 2007, and Oct. 10, 2008, the contents of which are hereby incorporated by reference into this application.

BACKGROUND OF THE INVENTION

The present invention relates to an optical transmission equipment and an optical network therefor, and more particularly to an optical transmission equipment using a wavelength selective switch and an optical network therefor.

In switching for each of wavelengths at a transmission equipment node in a wavelength division multiplexing (WDM) optical network in which optical signals of plural wavelengths are multiplexed within one optical fiber, an optical add/drop multiplexer (OADM) that demultiplexes and receives a part of wavelength within the plural wavelengths, and adds and transmits a part of wavelength within the plural wavelengths is commercially introduced, and is mainly being used in the optical network. In the future, development is expected of a wavelength cross-connect (WXC) equipment using a wavelength selective switch that not only demultiplexes and receives a part of wavelength, but also distributes and transmits an arbitrary wavelength to plural routes, and adds a part of wavelength, and distributes and transmits the added wavelength to an arbitrary route, with the prospect of the wavelength cross-connect equipment to be diversified into the optical network.

Referring to FIGS. 1A to 1D, the topology of a wavelength control optical network using the OADM and the WXC will be described. FIGS. 1A to 1D are block diagrams showing the optical network. For simplification of drawing, transmission/reception in one direction is shown in FIGS. 1A to 1D. Also, FIGS. 1A and 1B show only one node. Add and drop are represented by typical nodes. In FIGS. 1A to 1D and subsequent figures, bold solid lines represent an optical signal that is equal to larger than 1 in the number of wavelengths, and thin solid lines represent an optical signal that is 1 in the number of wavelength.

The OADM optical network is formed of a linear or ring network as shown in FIGS. 1A and 1C. The WDM signal into which plural wavelengths are multiplexed conducts the operation of drop, add, and through in each of the wavelengths by an OADM equipment 100, and transmits or receives the optical signal between the respective nodes.

The WXC node of the WXC optical network is applied to a node of a mesh network or a node of connection between the rings as shown in FIGS. 1B and 1D. A WXC equipment 20 conducts the operation of drop, add, and through in each of the wavelengths of the WDM signals that come from plural routes, distributes the WDM signals in the plural routes, and transmits or receives the optical signal between the respective nodes.

Referring to FIG. 1D, nodes other than between-ring connection nodes are formed of the OADM equipments 100, but may be formed of the WXC equipment 200. Referring to FIGS. 1A to 1D, a drop optical signal is output to a first optical transponder not shown. On the other hand, an add optical signal is an output signal of a second optical transponder (not shown) having a predetermined wavelength.

Referring to FIG. 2, the configuration of the OADM equipment will be described. FIG. 2 is a block diagram of the OADM equipment. Referring to FIG. 2, the WDM signal that is a wavelength multiplexed signal is demultiplexed, dropped or goes through in each of the wavelengths by a demultiplexer (DMUX) 11. Also, the added wavelengths are multiplexed with the through signals by a multiplexer (MUX) 12, and then transmitted. The OADM equipment 100 has a configuration of two routes/directions of a route a and a route b. In this example, the through signal is demultiplexed in each of the wavelengths, one by one. For that reason, when the transmitted optical signal is deteriorated by the low OSNR (optical signal to noise ratio), photoelectric conversion and electro-optical conversion are conducted by a regenerator (RGN) 3 to newly transmit an optical signal.

However, in the WXC equipment using the wavelength selective switch, because there exists no port where the through signal is demultiplexed wavelength by wavelength, no regenerator cannot be inserted, as disclosed in JP 2003-125430A.

SUMMARY OF THE INVENTION

The present invention has been made in view of the above circumstances, and therefore the present invention provides an optical transmission equipment and an optical network which use a wavelength selective switch that is capable of regenerating a through signal.

In order to insert a regenerator into the wavelength selective switch, there is provided at least one port that demultiplexes one wavelength among the wavelength multiplexed signals that are input to the wavelength selective switch. The output of the port where one wavelength is demultiplexed is input to the regenerator, and the output of the regenerator is again input to the wavelength selective switch. In this situation, the wavelength that is output from the regenerator is another wavelength different from the wavelength that is input to the regenerator, and is converted into a wavelength that can be processed by the wavelength selective switch in advance. The output from the regenerator is input to the wavelength selective switch through an optical coupler, a wavelength multiplexing filter, or another input port of the wavelength selective switch. Since the output of the regenerator is converted into a wavelength different from that of the input, the output of the regenerator does not return to the input of the regenerator through the wavelength selective switch.

The regenerated optical signal that has been again input to the wavelength selective switch is output to any one of the output ports by the wavelength selective switch, and transmitted to the subject route through another multiplexed wavelength selective switch.

The above object of the present invention can be achieved by the provision of an optical transmission equipment including a wavelength selective switch having an input port and plural output ports, and a regenerator that regenerates an optical signal, wherein the wavelength selective switch inputs an optical signal of a first wavelength to the regenerator, and the regenerator converts the optical signal of the first wavelength into an optical signal of a second wavelength, and inputs the optical signal of the second wavelength to a first wavelength selective switch.

The above object of the present invention can also be achieved by the provision of an optical transmission equipment including a first wavelength selective switch having a first input port and first to third output ports, a second wavelength selective switch having a second input port connected to the first output port, a third input port, and a fourth output port, and a regenerator that regenerates an optical signal, wherein the first wavelength selective switch receives a first wavelength multiplexed optical signal at the first input port, inputs the optical signal of the first wavelength included in the first wavelength multiplexed signal from the third output port to the regenerator, and transmits a drop optical signal from the second output port, wherein the second wavelength selective switch receives an add optical signal at the third input port, and transmits the second wavelength multiplexed optical signal from the fourth output port, and wherein the regenerator converts the optical signal of the first wavelength into an optical signal of a second wavelength, and inputs the optical signal of the second wavelength to the first wavelength selective switch.

The above object of the present invention can be further achieved by the provision of an optical network including a first ring network having plural optical branching equipments mutually connected, a second ring network having plural optical branching equipments mutually connected, and a wavelength cross-connect equipment that connects the first ring network with the second ring network, wherein the wavelength cross-connect equipment includes a first wavelength selective switch having a first input port and first to third output ports, a second wavelength selective switch having a second input port connected to the first output port, a third input port, and a fourth output port, and a regenerator that regenerates an optical signal, wherein the first wavelength selective switch receives a first wavelength multiplexed optical signal at the first input port, inputs the optical signal of the first wavelength included in the first wavelength multiplexed signal from the third output port to the regenerator, and transmits a drop optical signal from the second output port, wherein the second wavelength selective switch receives an add optical signal at the third input port, and transmits the second wavelength multiplexed optical signal from the fourth output port, and wherein the regenerator converts the optical signal of the first wavelength into an optical signal of a second wavelength, and inputs the optical signal of the second wavelength to the first wavelength selective switch.

BRIEF DESCRIPTION OF THE DRAWINGS

Preferred embodiments of the present invention will now be described in conjunction with the accompanying drawings, in which.

DETAILED DESCRIPTION OF THE PREFERRED EMBODIMENTS

Hereinafter, a description will be given of the embodiments with reference to the accompanying drawings.

The substantially same parts are given the same numerals, and descriptions are not repeated.

First Embodiment

Figure 1A:
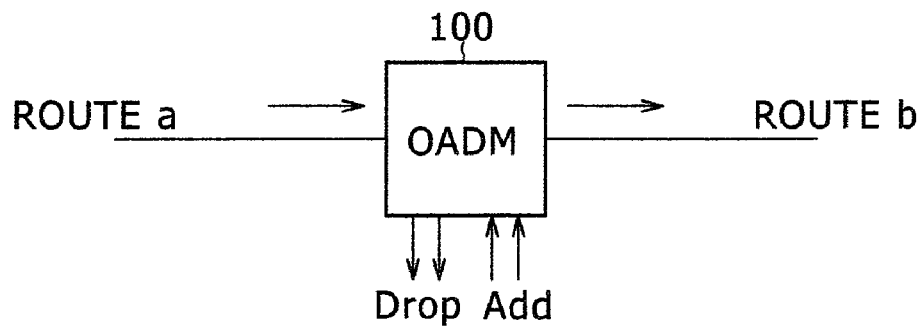
FIGS. 1A and 1B are diagrams for explaining nodes that configure an optical network.
Figure 1B:
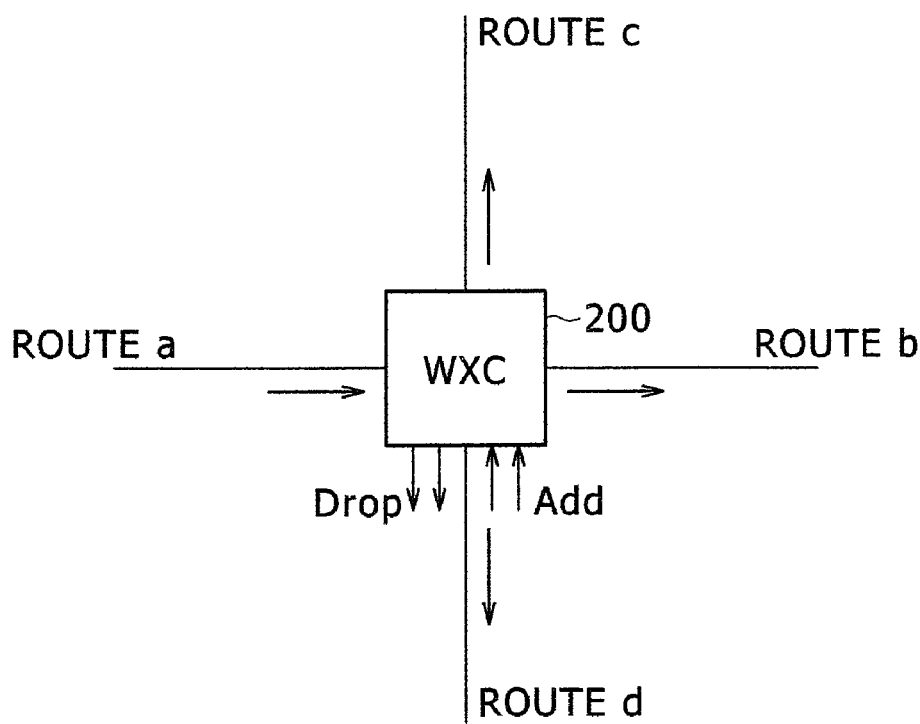
Figure 1C:
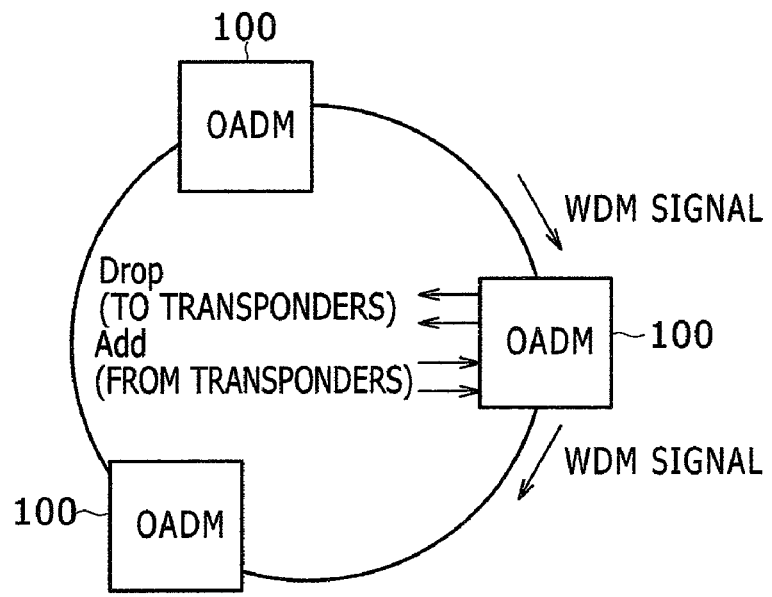
FIGS. 1C and 1D are block diagrams showing the optical network.
Figure 1D:
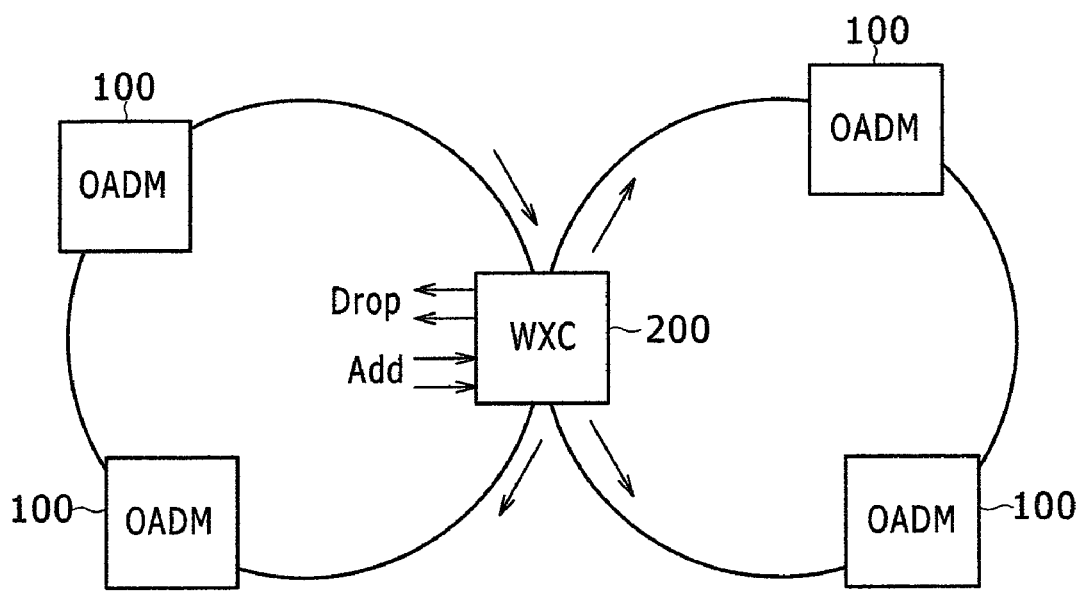
Figure 2:
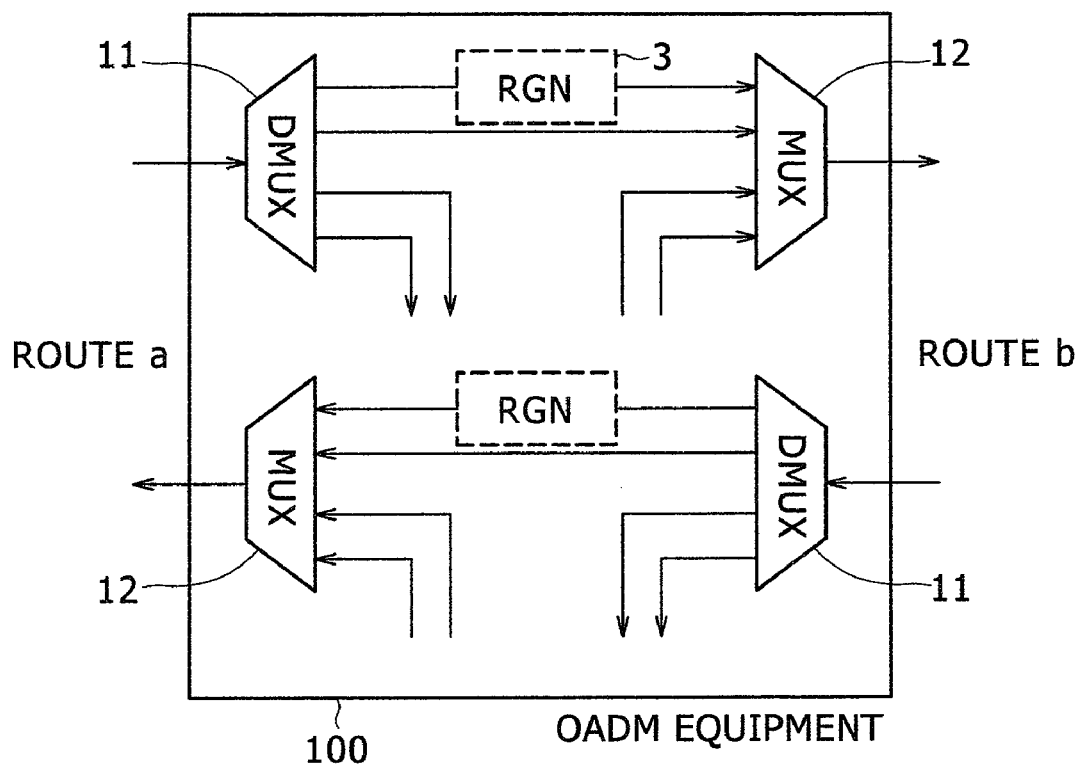
FIG. 2 is a block diagram showing an OADM equipment.
Figure 3:
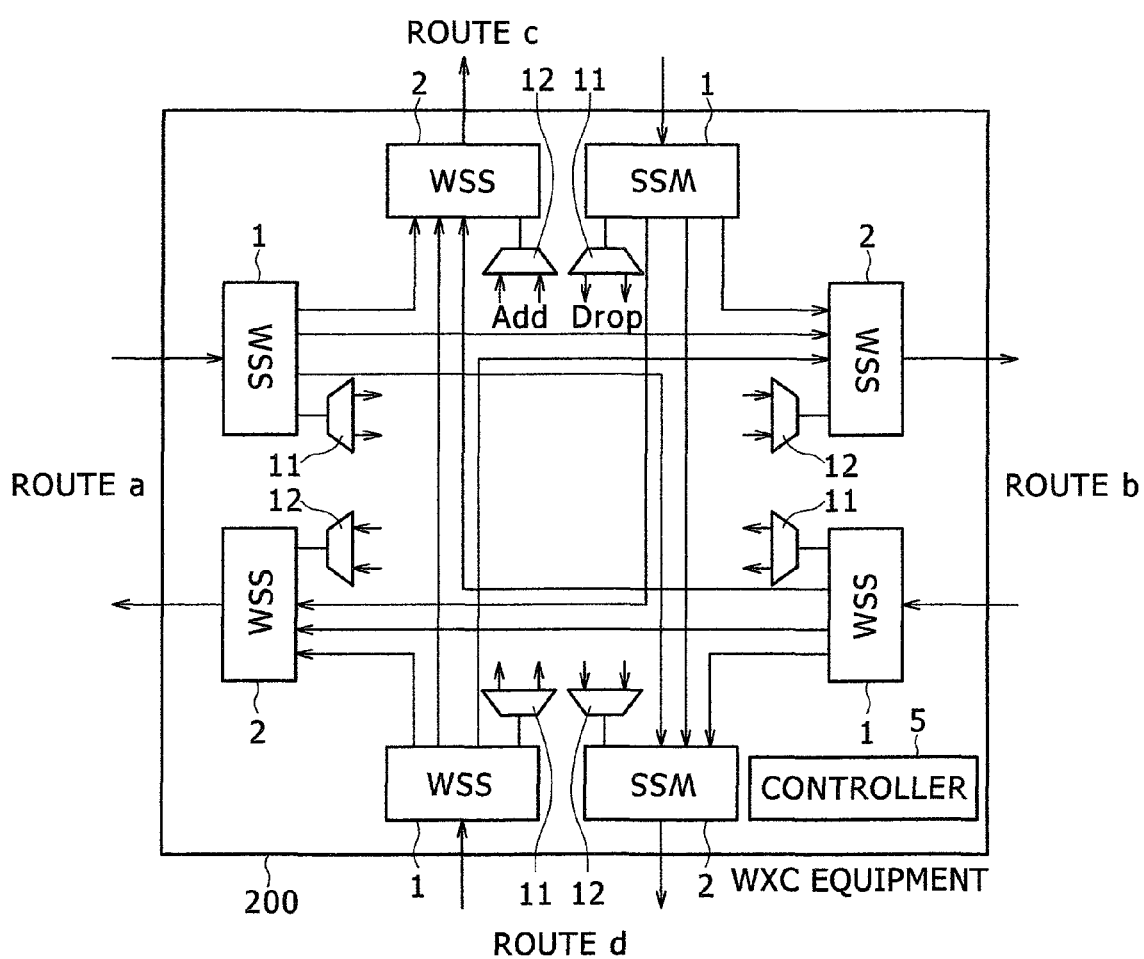
FIG. 3 is a block diagram showing a WXC equipment.

FIG. 3 is a block diagram showing the WXC equipment. In the figures subsequent to FIG. 3, the wavelength selective switch may be represented by a WSS (wavelength selective switch).

Referring to FIG. 3, a WXC equipment 200 is connected to four routes. The WXC equipment 200 employs four WSSs 1 having one input and N outputs (hereinafter referred to as "1×X", where N=4) and four WSSs 2 of N×1 at a receiving side and a transmitting side. The receiving side WSS 1 not only distributes a signal that drops the received WDM signal to a drop port due to a WXC equipment controller 5, but also distributes the WDM signal to three other routes as it is. The transmitting side WSS 2 multiplexes the signal that is distributed from the three other routes without changing the WDM signal other than the add signal, and transmits the signal to the optical transmission path. The drop port of the receiving side WSS 1 of the WXC equipment 200 is connected with a DMUX 11 to demultiplex the dropped wavelength multiplexed signal. Meanwhile, the add port of the transmitting side WSS 2 of the WXC equipment 200 is connected with an MUX 12 to multiplex the added optical signal. The output ports of the DMUX 11 and the input ports of the MUX 12 are connected with an optical transponder not shown, respectively.

As shown in FIG. 3, in the WXC equipment 200 using the wavelength selective switches 1 and 2, the WDM signal that is configured by the plural wavelengths is transferred in a route that is transferred from the receiving side WSS 1 to the transmitting side WSS 2. That is, the regenerator cannot be inserted because the WDM signal is not divided wavelength by wavelength.

The above operation will be described with reference to FIGS. 4A and 4B. Referring to FIG. 4A, the receiving side WSS 1 has 1×N WSS (N=4) where the number of input ports is one, and the number of output ports is N. The input optical signal includes a wavelength group L1a including plural wavelengths, and is distributed to the wavelength groups L1b, L1c, L1d, and L1s having an arbitrary wavelength by the controller 5 shown in FIG. 3. The number of wavelengths of L1a is equal to the sum of the lengths of wavelengths of L1b, L1c, L1d, and L1s. The wavelength groups L1b, L1b, and L1d are directed toward the routes b, c, and d, respectively, and L1s is a drop signal wavelength group.

Figure 4B:
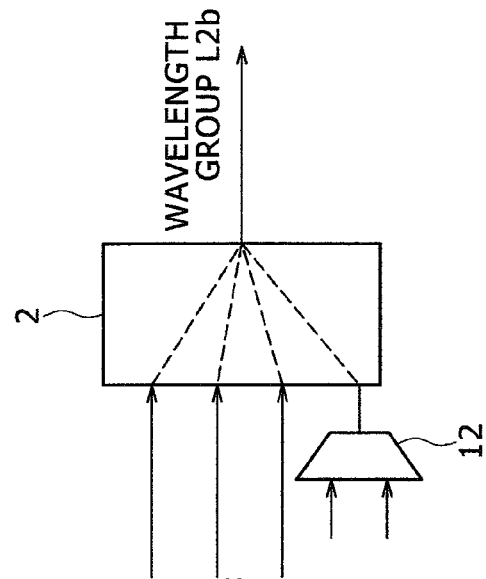
FIGS. 4A and 4B are diagrams for explaining the operation of a WSS.
Figure 4A:
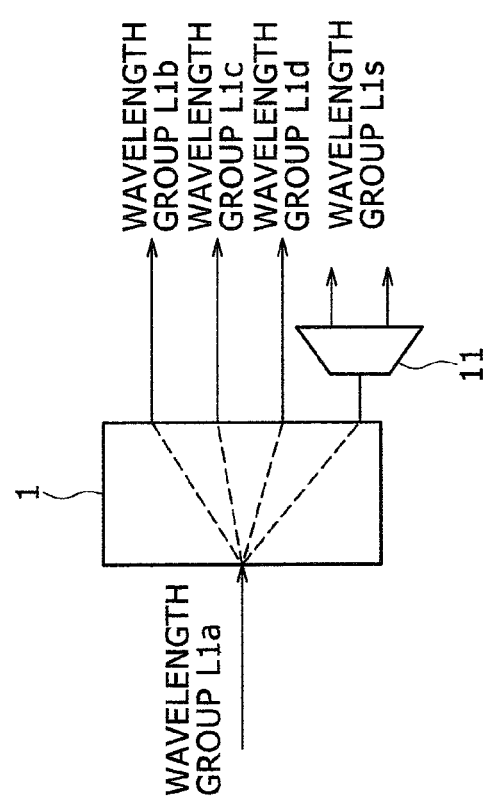

Referring to FIG. 4B, the wavelength group L1b, L1c, and L1d which are transferred to the transmitting side WSS 2 is a WDM signal configured by the plural wavelengths, respectively. A WSS 1 is an equipment that conducts the branching and the route switch by one casing module, and is impossible of taking out only a single wavelength to the casing, and conducting some processing. Accordingly, the WSS 1 cannot insert the regenerator into the respective wavelengths.

Also, a transmitting side WSS 2 shown in FIG. 4B has N×1 WSS (N=4) where the number of input ports is N, and the number of output ports is 1. An input optical signals are a wavelength group L2a, L2c, and L2d including plural wavelengths which come from the respective routes a, c, and d, and a wavelength group L2s of the add signals. The input optical signals are multiplexed to the wavelength group L2b and output under the control of the controller 5 shown in FIG. 3. L2a=L1b is satisfied. The sum of wavelengths of L2a, L2c, L2d, and L2s is equal to the number of wavelengths of L2b. Accordingly, in the WXC network using the wavelength selective switch described with reference to FIGS. 3, 4A and 4B, the optical signal goes through the node and is transmitted to the respective routes as the optical signal without being converted into electricity. For that reason, even if the optical signal is deteriorated by the OSNR or the waveform distortion by passing through the optical transmission path, the optical amplifier, and the WXC equipment several times, the optical signal cannot be reproduced, and cannot be transmitted between desired nodes.

Figure 5:
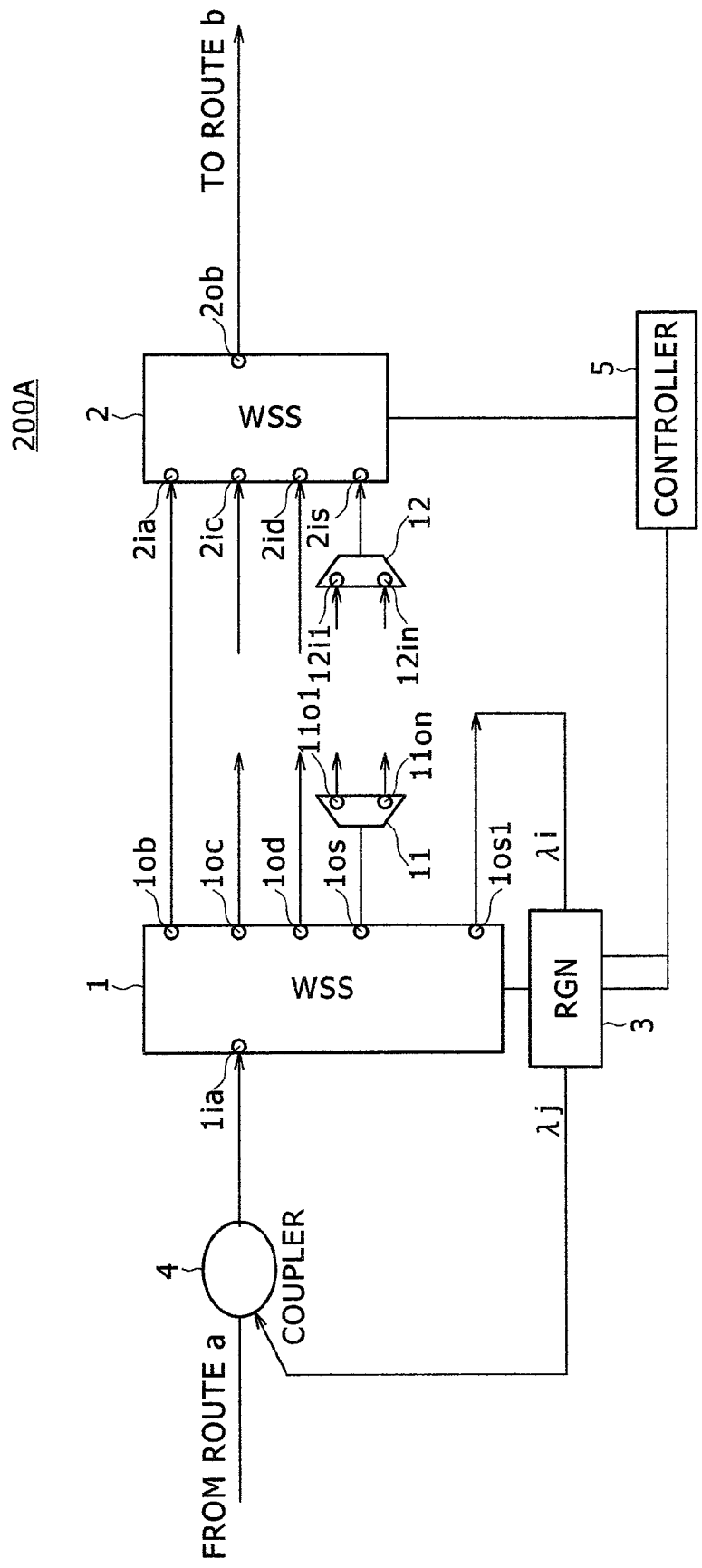
FIG. 5 is a block diagram showing another WXC equipment.

Referring to FIG. 5, the configuration of another WXC equipment using wavelength selective switches will be described. FIG. 5 is a block diagram showing another WXC equipment. As described in FIG. 3, when four routes are provided, eight WSSs are required, but for simplification of drawing, only two WSSs in on direction from the route a to the route b is taken out, and will be described below.

Referring to FIG. 5, the WXC equipment 200A includes a 1×5 WSS 1, a wavelength demultiplexer 11, a wavelength multiplexer 12, a 4×1 WSS 2, a regenerator 3, a coupler 4, and a controller 5. The controller 5 controls the route setting in each of the wavelengths of the WSS 1 and WSS 2, and the output wavelength setting of the regenerator 3.

The WXC equipment 200A inputs the wavelength multiplexed signal having plural wavelengths which has been transmitted through a transmission line fiber of the route a to the input port 1ia of the receiving side wavelength selective switch (WSS) 1 through the coupler 4. The receiving side WSS 1 arbitrarily distributes the wavelengths of the wavelength multiplexed signal to output ports 1ob, 1oc, 1od, 1os, and 1os1, respectively, by setting from the controller 5. The output ports 1ob, 1oc, and 1od are outputs to the routes b, c, and d, respectively. Since the transmitting side WSS to the routes c and d is omitted from description, the output port 1ob is connected to an input port 2ia of the transmitting side WSS 2, and output to the route b from the output port 2ob of the transmitting side WSS 2. The output port 1os of the WSS 1 is a port for dropping to the WXC equipment 200A, and the ports 11o1 to 11on of the demultiplexer 11 are connected to transponders not shown.

By setting from the controller 5, the WSS 2 inputs the through signals through the routes a, c, and d from the ports 2ia, 2ic, and 2id, respectively, and inputs the add signal that is multiplexed by the multiplexer 12 which is connected to the port 2is. The WWS 2 transmits the WDM signal from the port 2ob to the route b. The input ports 12i1 to 12in of the multiplexer 12 are connected with optical transponders not shown.

Only one specific wavelength is output to the output port 1os1 of the WSS1 by setting from the controller 5, and reproduced (3R: reshaping, retiming, regeneration) by the regenerator (RGN) 3. In this situation, a wavelength λj that is output from the regenerator 3 is set with the output wavelength from the controller 5 so as to provide a wavelength different from a wavelength λi which is input to the regenerator 3. Then, the wavelength λj is converted into a wavelength processable by the WSS 1. The output from the regenerator 3 is input to the WSS 1 through the optical coupler 4. Since the output of the regenerator 3 is converted into the wavelength λj which is different from the input, the output of the regenerator 3 does not again return to the input of the regenerator 3 through the WSS 1. In this embodiment, the wavelength that is output from the regenerator 3 needs to be determined as a reproduction wavelength in advance when the wavelength is fixed. However, when the regenerator with an optical transmitter having a variable wavelength is used, the wavelength can be selected from unused wavelengths among all of the wavelengths that can be used by the wavelength selective switch by setting from the controller 5. The wavelength resource can be effectively used. The optical receiver with the regenerator 3 has a wide dynamic range with respect to the wavelength. Therefore, at the receiving side, the optical receiver can use any wavelengths that can pass through the WSS 1 and WSS 2. The above description is applied to another embodiment of the present specification.

The reproduced optical signal of the wavelength λj which is again input to the WSS 1 is output to any one of the output ports 1ob, 1oc, and 10d by the WSS 1 set by the controller 5, and then transmitted through the WSS 2 at the transmitting side or a WSS not shown.

TABLE 1

Correspondence of port to wavelength (group)
Receiving side WSS

| Input port | Wavelength group | Output port | Wavelength (group) |
|---|---|---|---|
| 1ia | L1a | 1ob | L1b |
|  |  | 1oc | L1c |
|  |  | 1od | L1d |
|  |  | 1os | L1s |
|  |  | 1os1 | λi |

A table that puts together the wavelengths or the wavelength groups to the respective ports of the WSS and the regenerator (RGN) which are set by the controller 5 in the above operation of FIG. 5 is shown in Tables 1 to 3. In Table 1, "1ia" is registered as information that identifies the input port of the WSS 1 in FIG. 5, and information "L1a" that identifies the wavelength group is registered as the information on the wavelength group of the optical signal which is input to the input port 1ia. Also, in Table 1, "1ob", "1oc", "1od", "1os", and "1os1" are registered as information for identifying the output port of the WSS 1, and "L1b", "L1c", "L1d", "L1s", and "λi" are registered as information for identifying the optical signals that are output from those output ports.

The number of wavelengths of L1a is the sum of the number of wavelengths of L1b, L1c, L1d, and L1s, plus 1. One of L1b, L1c and L1d includes λj. L1a includes λi and λj.

TABLE 2

Correspondence of port to wavelength group
Transmitting side WSS

| Input port | Wavelength group | Output port | Wavelength group |
|---|---|---|---|
| 2ia | L2a |  |  |
| 2ic | L2c | 2ob | L2b |
| 2id | L2d |  |  |
| 2is | L2s |  |  |

Similarly, in Table 2 related to the WSS 2, "2ia", "2ic", "2id", and "2is" are registered as information for identifying the input port of the WSS 2, and information "L2a", "L2c", "L2d", and "L2s" on the wavelength groups to the above information are registered. "2ob" is registered as information for identifying the output port of the WSS 2, and information "L2b" on the wavelength group to the above information is registered.

The sum of the number of wavelengths of L2a, L2c, L2d, and L2s is equal to the number of wavelengths of L2b. Also, the number of wavelengths of L1a is equal to the number of wavelengths of L2b.

TABLE 3

Input output wavelength table
RGN

| Input wavelength | Output wavelength |
|---|---|
| λi | λj |

Also, in Table 3, in the regenerator (RGN) 3 shown in FIG. 5, "λi" is registered as information for identifying the wavelength of the optical signal which is input to the input port, and "λj" is registered as information on the wavelength that is output after wavelength conversion, respectively. λi is not equal to λj.

The wavelength cross-connect equipment 200A stores information in Tables 1 to 3 in a memory not shown. The controller 5 refers to the information that is stored in the memory, and conducts the respective setting in the WSS 1, the WSS 2, and the RGN 3.

Second Embodiment

Figure 6:
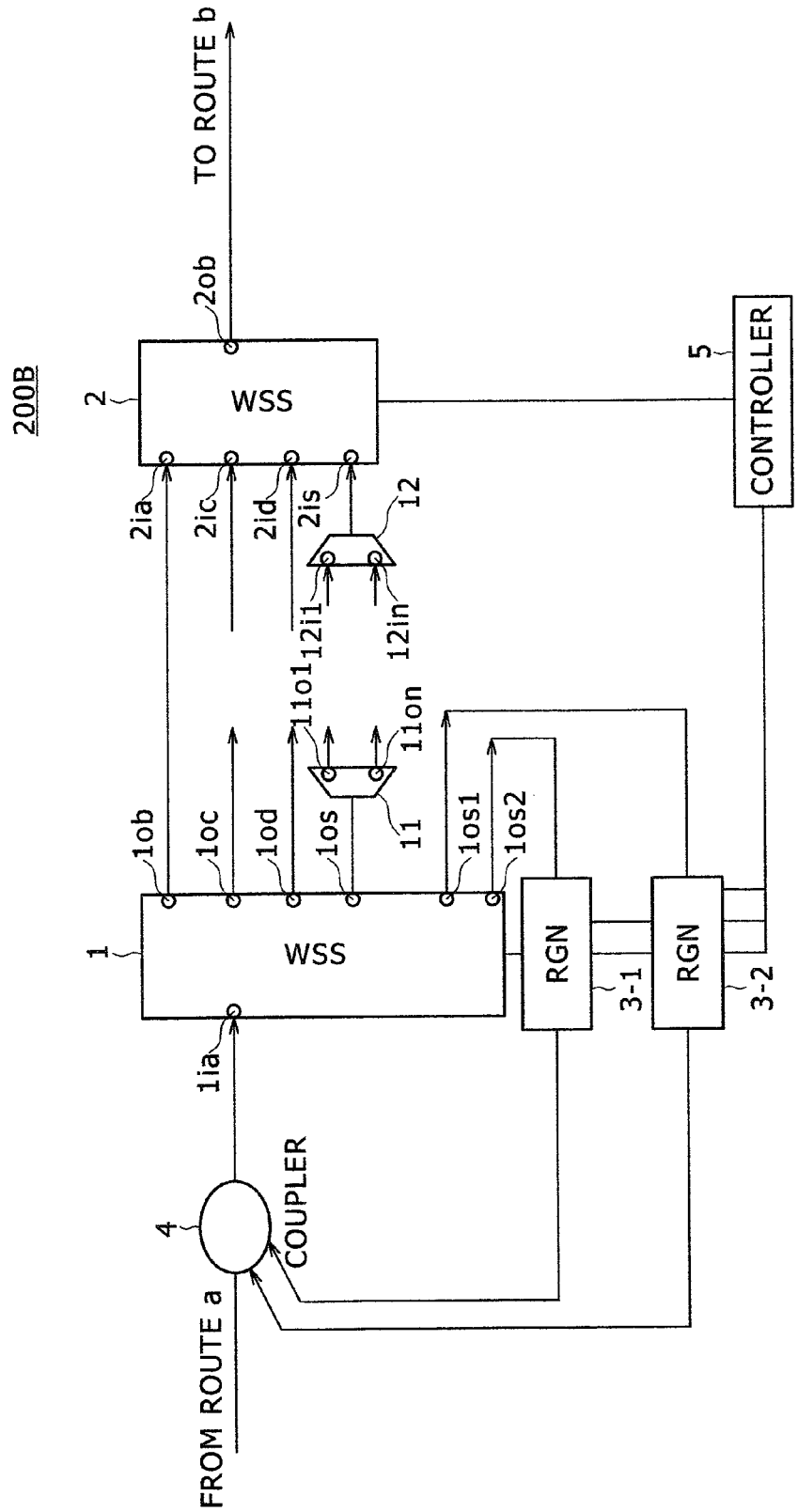
FIG. 6 is a block diagram showing another WXC equipment.

The configuration of another WXC equipment using wavelength selective switches will be described with reference to FIG. 6. FIG. 6 is a block diagram of another WXC equipment. Referring to FIG. 6, a WXC equipment 200B includes a 1×6 WSS 1, a demultiplexer 11, a multiplexer 12, a 4×1 WSS 2, two regenerators 3-1, 3-2, a coupler 4, and a controller 5. The controller 5 controls the route setting in each of the respective wavelengths of WSS 1 and WSS 2 in the WXC equipment 200B, and the output wavelength setting of the two regenerators 3.

The WXC equipment 200B outputs only one specific wavelength to the two output ports 1*os*1 and 1*os*2 of the receiving side WSS 1 by setting from the controller 5, respectively, and reproduces the signals by different regenerators (RGNs) 3. In this situation, the wavelength that is output from the regenerator 3 is set with the output wavelength from the controller 5 so as to provide a wavelength different from the wavelength which is input to the regenerator 3, and then converted into a processable wavelength by the receiving side WSS 1. The outputs from the two regenerators 3 are input to the receiving side WSS 1 through the optical coupler 4. Since the output of the regenerator 3 is converted into the wavelength different from that of the input, the output does not return to the input of the regenerator 3 through the WSS 1.

TABLE 4

Correspondence of port to wavelength (group)
Receiving side WSS

| Input port | Wavelength group | Output port | Wavelength (group) |
|---|---|---|---|
| 1*ia* | L1a | 1*ob* | L1*b* |
|  |  | 1*oc* | L1*c* |
|  |  | 1*od* | L1*d* |
|  |  | 1*os* | L1*s* |
|  |  | 1*os*1 | λi |
|  |  | 1*os*2 | λm |

A table that puts together the wavelengths or the wavelength groups to the respective ports of the WSS and the regenerator (RGN) which are set by the controller 5 in the above operation of FIG. 6 is shown in Tables 2 to 5. In Table 4, "1*ia*" is registered as information that identifies the input port of the WSS 1 in FIG. 6, and information "L1*a*" that identifies the wavelength group is registered as the information on the wavelength group of the signal light which is input to the input port. Also, in Table 4, "1*ob*", "1*oc*", "1*od*", "1*os*", "1*os*1", and "1*os*2" are registered as information for identifying the output port of the WSS 1, and "L1*b*", "L1*c*", "L1*d*", "L1*s*", "λi" and "λm" are registered as information for identifying the signal lights that are output from those output ports.

The number of wavelengths of L1*a* is the sum of the number of wavelengths of L1*b*, L1*c*, L1*d*, and L1*s*, plus 2. One of L1*b*, L1*c* and L1*d* includes λj and λn. L1*a* includes λi, λj, λm and λn. A table of port to wavelength (group) correspondence related to WSS 2 is identical with that in Table 2.

TABLE 5

Input/output wavelength table

| RGN1 | | RGN2 | |
|---|---|---|---|
| Input wavelength | output wavelength | Input wavelength | Output wavelength |
| λi | λj | λm | λn |

Also, in Table 5, in the regenerator 3-1, "λi" is registered as information that identifies the wavelength of the signal light which is input to the input port, and "λj" is registered as information of the wavelength which is output after conversion, respectively. In Table 5, the same information is registered in the regenerator 3-2. λi is not equal to λj. λm is not equal to λn.

The wavelength cross-connect equipment 200B stores information shown in Tables 2, 4 and 5 in a memory not shown. The controller 5 refers to the information that is stored in the memory, and conducts the respective setting in the WSS 1, the WSS 2, the RGN 3-1, and the RGN 3-2, respectively.

Third Embodiment

Figure 7:
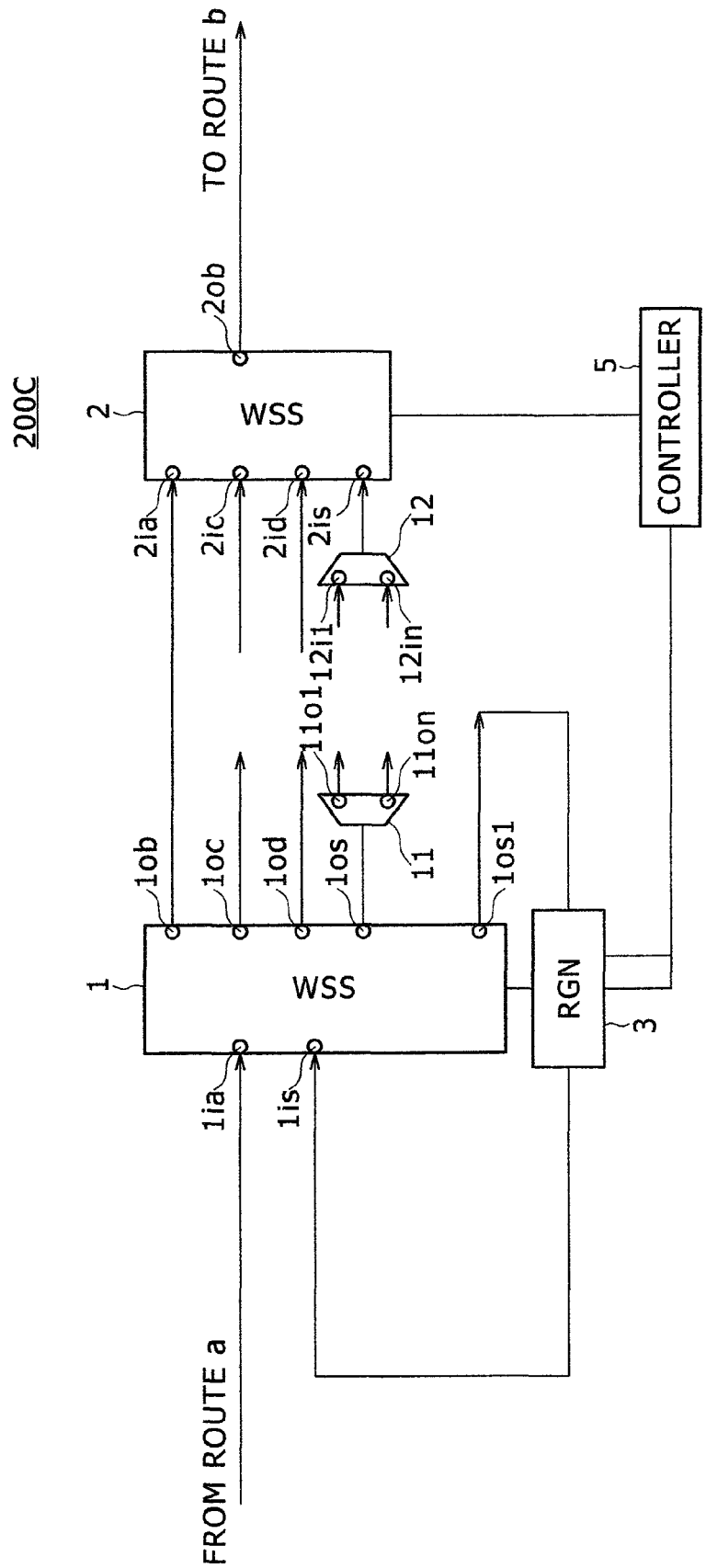
FIG. 7 is a block diagram showing another WXC equipment.

The configuration of another WXC equipment using wavelength selective switches will be described with reference to FIG. 7. FIG. 7 is a block diagram of another WXC equipment. Referring to FIG. 7, a WXC equipment 200C includes a 2×5 WSS 1, a demultiplexer 11, a multiplexer 12, a 4×1 WSS 2, a regenerator 3, a coupler 4, and a controller 5. The controller 5 controls the route setting in each of the respective wavelengths of WSS 1 and WSS 2 in the WXC equipment 200C, and the output wavelength setting of the regenerator 3.

The WXC equipment 200C inputs the wavelength multiplexed signal including plural wavelengths which have been transmitted through the transmission line fiber in the route a to the input port 1*ia* of the receiving side WSS1. The output from the regenerator 3 is input to the WSS 1 through another input port 1*is* of the receiving side WSS 1. Since the output of the regenerator 3 is converted into the wavelength different from that of the input by setting from the controller 5, the output does not return to the input of the regenerator 3 through the WSS 1.

TABLE 6

Correspondence of port to wavelength (group)
Receiving side WSS

| Input port | Wavelength (group) | Output port | Wavelength (group) |
|---|---|---|---|
|  |  | 1*ob* | L1*b* |
|  |  | 1*oc* | L1*c* |

TABLE 6-continued

Correspondence of port to wavelength (group)
Receiving side WSS

| Input port | Wavelength (group) | Output port | Wavelength (group) |
|---|---|---|---|
| 1ia | L1a | 1od | L1d |
| 1is | λj | 1os | L1s |
|  |  | 1os1 | λi |

A table that puts together the wavelengths or the wavelength groups to the respective ports of the WSS and the regenerator (RGN) which are set by the controller 5 in the above operation of FIG. 7 is shown in Tables 6, 2, and 3. In Table 6, "1*ia*" and "1*is*" are registered as information that identifies the input port of the WSS 1 in FIG. 7, and information "L1*a*" and "λj" that identify the wavelength (group) are registered as the information on the wavelength (group) of the signal light which is input to the input port in association with the respective input ports. Also, in Table 6, "1*ob*", "1*oc*", "1*od*", "1*os*", and "1*os*1" are registered as information for identifying the output port of the WSS 1, and "L1*b*", "L1*c*", "L1*d*", "L1*s*", and "λi" are registered as information for identifying the signal lights that are output from those output ports.

The number of wavelengths of L1*a* is the sum of the number of wavelengths of L1*b*, L1*c*, L1*d*, and L1*s*. One of L1*b*, L1*c* and L1*d* includes λj. L1*a* includes λi.

The table of port to wavelength (group) correspondence related to the WSS 2 is identical with that in Table 2. The input/output wavelength table related to the regenerator 3 is identical with that in Table 3.

The wavelength cross-connect equipment 200C stores the information shown in Tables 6, 2, and 3 in a memory not shown. The controller 5 refers to the information that is stored in the memory, and conducts the respective setting in the WSS 1, the WSS 2, and the RGN 3.

Fourth Embodiment

Figure 8:
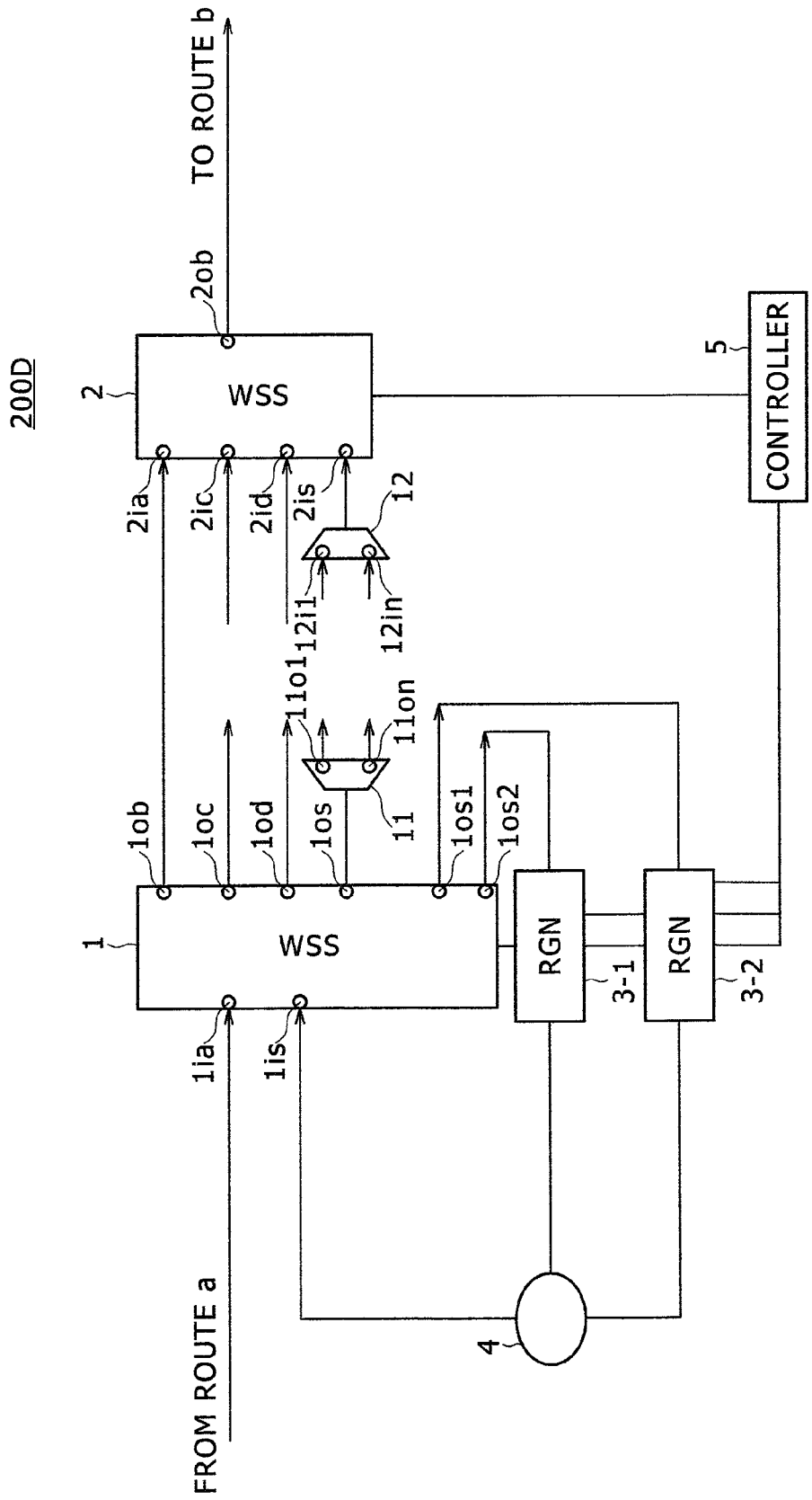
FIG. 8 is a block diagram showing another WXC equipment.

The configuration of another WXC equipment using wavelength selective switches will be described with reference to FIG. 8. FIG. 8 is a block diagram of another WXC equipment. Referring to FIG. 8, a WXC equipment 200D includes a 2×6 WSS 1, a demultiplexer 11, a multiplexer 12, a 4×1 WSS 2, two regenerators 3-1, 3-2, a coupler 4, and a controller 5. The controller 5 controls the route setting in each of the respective wavelengths of WSS 1 and WSS 2 in the WXC equipment 200D, and the output wavelength setting of the regenerator 3.

The WXC equipment 200D outputs only one specific wavelength to the plural ports 1*os*1 and 1*os*2 of the receiving side WSS 1 by setting from the controller 5, and reproduces the signals by different regenerators (RGNs) 3. In this situation, the wavelength that is output from the regenerator 3 is set with the output wavelength from the controller 5 so as to provide a wavelength different from the wavelength which is input to the regenerator 3, and then converted into a processable wavelength by the receiving side WSS 1. The outputs from the two regenerators 3 are input to the receiving side WSS 1 through the optical coupler 4 and the input port 1*is* of the receiving side WSS 1. Since the output of the regenerator 3 is converted into the wavelength different from that of the input, the output does not return to the input of the regenerator 3 through the WSS 1.

TABLE 7

Correspondence of port to wavelength (group)
Receiving side WSS

| Input port | Wavelength group | Output port | Wavelength (group) |
|---|---|---|---|
|  |  | 1ob | L1b |
|  |  | 1oc | L1c |
| 1ia | L1a | 1od | L1d |
| 1is | λj, λn | 1os | L1s |
|  |  | 1os1 | λi |
|  |  | 1os2 | λm |

A table that puts together the wavelengths or the wavelength groups to the respective ports of the WSS and the regenerator (RGN) which are set by the controller 5 in the above operation of FIG. 8 is shown in Tables 7, 2 and 5. In Table 7, "1*ia*" and "1*is*" are registered as information that identifies the input port of the WSS 1 in FIG. 8, and information "L1*a*", "λj" and "λn" that identify the wavelength (group) are registered as the information on the wavelength (group) of the signal light which is input to the input port in association with the respective input ports. Also, in Table 7, "1*ob*", "1*oc*", "1*od*", "1*os*", "1*os*1", and "1*os*2" are registered as information for identifying the output port of the WSS 1, and "L1*b*", "L1*c*", "L1*d*", "L1*s*", "λi", and "λm" are registered as information for identifying the signal lights that are output from those output ports.

The number of wavelengths of L1*a* is the sum of the number of wavelengths of L1*b*, L1*c*, L1*d* and L1*s*. Any one of L1*b*, L1*c* and L1*d* includes λj and λn. L1*a* includes λi and λm.

A table of port to wavelength (group) correspondence related to WSS 2 is identical with that in Table 2. A table of the regenerators 3-1, 3-2 is identical with that of Table 5.

The wavelength cross-connect equipment 200D stores the information shown in Tables 7, 2, and 5 in a memory not shown. The controller 5 refers to the information that is stored in the memory, and conducts the respective setting in the WSS 1, the WSS 2, the RGN 3-1, and the RGN 3-2.

According to the above embodiments, there can be provided an optical transmission equipment and an optical network which connect the regenerator to the wavelength selective switch for use, in which there is no optical path limit due to the deterioration of the signal quality.

What is claimed is:

1. An optical transmission equipment comprising:
    a first wavelength selective switch having a first input port and a plurality of first output ports; and
    a regenerator that regenerates an optical signal,
    wherein the first wavelength selective switch inputs an optical signal of a first wavelength to the regenerator, and
    wherein the regenerator converts the optical signal of the first wavelength into an optical signal of a second wavelength, and inputs the optical signal of the second wavelength to the first wavelength selective switch.

2. The optical transmission equipment according to claim 1, further comprising a second wavelength selective switch having a plurality of second input ports and a second output port,
    wherein one of the plurality of first output ports and one of the plurality of second input ports are connected to each other.

3. The optical transmission equipment according to claim 1, wherein a transmitter of the regenerator has a variable wavelength.

4. The optical transmission equipment according to claim 2, wherein a transmitter of the regenerator has a variable wavelength.

5. The optical transmission equipment according to claim 1,
   wherein the first wavelength selective switch further includes a third input port, and
   wherein the regenerator inputs the optical signal of the second wavelength from the third input port to the first wavelength selective switch.

6. The optical transmission equipment according to claim 2,
   wherein the first wavelength selective switch further includes a third input port, and
   wherein the regenerator inputs the optical signal of the second wavelength from the third input port to the first wavelength selective switch.

7. The optical transmission equipment according to claim 3,
   wherein the first wavelength selective switch further includes a third input port, and
   wherein the regenerator inputs the optical signal of the second wavelength from the third input port to the first wavelength selective switch.

8. The optical transmission equipment according to claim 4,
   wherein the first wavelength selective switch further includes a third input port, and
   wherein the regenerator inputs the optical signal of the second wavelength from the third input port to the first wavelength selective switch.

9. An optical transmission equipment, comprising:
   a first wavelength selective switch having a first input port and first to third output ports;
   a second wavelength selective switch having a second input port connected to the first output port, a third input port, and a fourth output port; and
   a regenerator that regenerates an optical signal,
   wherein the first wavelength selective switch receives a first wavelength multiplexed optical signal at the first input port, inputs the optical signal of the first wavelength included in the first wavelength multiplexed signal from the third output port to the regenerator, and transmits a drop optical signal from the second output port,
   wherein the second wavelength selective switch receives an add optical signal at the third input port, and transmits the second wavelength multiplexed optical signal from the fourth output port, and
   wherein the regenerator converts the optical signal of the first wavelength into an optical signal of a second wavelength, and inputs the optical signal of the second wavelength to the first wavelength selective switch.

10. The optical transmission equipment according to claim 9, wherein a transmitter of the regenerator has a variable wavelength.

11. The optical transmission equipment according to claim 9,
    wherein the first wavelength selective switch further includes a fourth input port, and
    wherein the regenerator inputs the optical signal of the second wavelength from the fourth input port to the first wavelength selective switch.

12. The optical transmission equipment according to claim 10,
    wherein the first wavelength selective switch further includes a fourth input port, and
    wherein the regenerator inputs the optical signal of the second wavelength from the fourth input port to the first wavelength selective switch.

13. An optical network, comprising:
    a first ring network having a plurality of optical branching equipments mutually connected;
    a second ring network having a plurality of optical branching equipments mutually connected; and
    a wavelength cross-connect equipment that connects the first ring network with the second ring network,
    wherein the wavelength cross-connect equipment includes a first wavelength selective switch having a first input port and first to third output ports, a second wavelength selective switch having a second input port connected to the first output port, a third input port, and a fourth output port, and a regenerator that regenerates an optical signal,
    wherein the first wavelength selective switch receives a first wavelength multiplexed optical signal at the first input port, inputs the optical signal of the first wavelength included in the first wavelength multiplexed signal from the third output port to the regenerator, and transmits a drop optical signal from the second output port,
    wherein the second wavelength selective switch receives an add optical signal at the third input port, and transmits the second wavelength multiplexed optical signal from the fourth output port, and
    wherein the regenerator converts the optical signal of the first wavelength into an optical signal of a second wavelength, and inputs the optical signal of the second wavelength to the first wavelength selective switch.

14. The optical network according to claim 13, wherein a transmitter of the regenerator has a variable wavelength.

15. The optical transmission equipment according to claim 13,
    wherein the first wavelength selective switch further includes a fourth input port, and
    wherein the regenerator inputs the optical signal of the second wavelength from the fourth input port to the first wavelength selective switch.

16. The optical transmission equipment according to claim 14,
    wherein the first wavelength selective switch further includes a fourth input port, and
    wherein the regenerator inputs the optical signal of the second wavelength from the fourth input port to the first wavelength selective switch.

* * * * *